April 16, 1935.   P. F. HACKETHAL   1,997,903

PROCESS OF GRINDING BEARINGS

Filed June 30, 1932

INVENTOR
Paul F. Hackethal

BY Ely & Barrow

ATTORNEYS

Patented Apr. 16, 1935

1,997,903

UNITED STATES PATENT OFFICE 1,997,903

PROCESS OF GRINDING BEARINGS

Paul F. Hackethal, Rocky River, Ohio, assignor, by mesne assignments, to Aviation Manufacturing Corporation, Chicago, Ill., a corporation of Delaware Application June 30, 1932, Serial No. 620,181

2 Claims. (Cl. 51—278)

This invention relates to the process of machining or grinding bearings, and more particularly to the process of machining or grinding that type of ball thrust bearings having a plurality of ball bearing races. The accurate machining or grinding of such bearings permits a plurality of such units to be superimposed as any thrusts or strains are thereby equally divided and transmitted to the separate rows of balls.

An object of this invention is to provide a process for accurately grinding an assembled ball bearing unit comprising two or more separate ball bearings, in order that a plurality of separate ball bearings may be superimposed, and another object is to provide a relatively inexpensive and simple process for accomplishing the above.

Other and various objects of the invention will appear as the description proceeds. The various features of the invention are shown in the illustrative embodiment shown in the drawing and described in the specification and claims.

Figure 1:
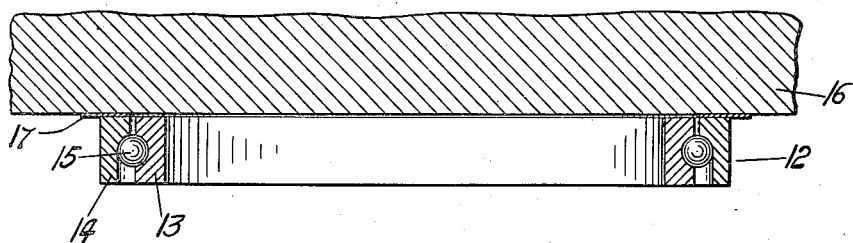
Fig. 1 is a sectional view of a single ball thrust bearing unit held against a chuck in a position for the first grinding operation.
Figure 2:
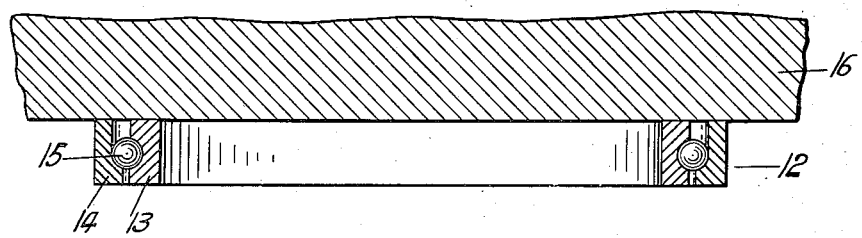
Fig. 2 is a view corresponding to Fig. 1 showing the chuck applied to the ground side of the bearing in a position for the second grinding operation.
Figure 3:
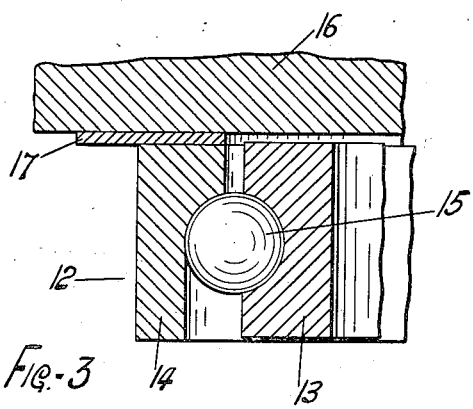
Fig. 3 is an enlarged view of the bearing and a part of the chuck shown at the left hand end of Fig. 1.
Figure 4:
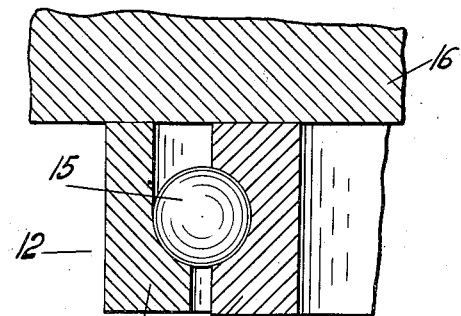
Fig. 4 is an enlarged view of the bearing and a part of the chuck as shown at the left hand end of Fig. 2.

The standard practise now in use for aligning and assembling ball thrust bearings is to first grind the separate ball races and then to assemble the ball races over the balls. Frequently there are variations in the sizes of balls used. This results in material variations in alignment in the assembled bearings. Such inaccuracies can only be eliminated by grinding the mating faces of the bearings.

In certain applications it has been found desirable to use a plurality of ball thrust bearings each consisting of two ball races with a row of balls between them, and to impose one bearing upon the other with the object to distribute the total load applied on such unit nearly equally over all rows of balls. It is, of course, well understood that the highest degree of accuracy and precision is required in cutting or grinding the contacting faces of such bearing units. If, for example, one of the mating faces of a ball race extends slightly further out than the other, the stress and strain between the various ball bearings is unequally divided and the resulting uneven strain or thrust will cause an unequal burden to be assumed by certain of the bearings, thus resulting in the premature wearing of these particular bearings and seriously impairing the efficiency of the whole unit. This feature is particularly emphasized where, for example, six or more separate ball bearing units are used, it being apparent that the sum and total of the inaccuracies between the units will result, in the aggregate, in a relatively high degree of inaccuracy.

The invention is shown herein in connection with a standard thrust ball bearing, having a ball race 12 composed of two separate annular ball races, an inner ball race 13 and an outer ball race 14, between which are mounted a plurality of standard balls 15, only one of such ball bearings being shown in the drawing herein.

This invention relates particularly to the object of producing a ball bearing on which the faces of the inner and outer races are in nearly perfect alignment when the balls are assembled between the rows and bearing against the thrust sides of both the inner and outer races. In the standard ball bearings comprising the two ball races 13 and 14 there is allowed a certain tolerance or inaccuracy of alignment on their outer faces after they are assembled, and it is highly essential, where a plurality of such separate ball bearings are to be superimposed, that they be accurately aligned. One way of obtaining this result consists in holding a completely assembled individual ball bearing, as above described, against one face of the magnetic chuck 16, and preferably a metal spacer 17 is enclosed between the outer ball race 14 and the chuck. The use of the spacer 17 assures the proper seating of both races on the ball on the load line.

While the bearing is thus held against the chuck 16, the opposite faces on the inner and outer races 13 and 14 of the bearing away from the chuck are ground, or cut to a high degree of precision in line with each other, and then the spacer 17 is removed and the opposite or ground faces of the bearing are placed directly against the chuck, without the spacer 17, while the faces initially held against the chuck are ground in line as heretofore described, and parallel to the faces which are now against the magnetic chuck.

The separate ball bearings which have been thus ground are then in condition to be positioned one on top of the other, and to thus be used in a multitude of places well known to those skilled in the art. In some types of work it may be found advantageous to use six or more bearing units.

It will be understood to those skilled in the art that my invention has various uses, objects and embodiments other than those mentioned or described herein, and that it may be variously changed, used or modified without departing from the spirit of my invention or sacrificing the advantages thereof. It, therefore, will be understood that this embodiment of my invention is illustrative and that my invention is not limited thereto.

What is claimed is:

1. The method of machining anti-friction bearings which consists in holding by a chuck and in spaced relation thereto one race of an assembled unit composed of two separate bearing races with anti-friction elements imposed therebetween, so that the other race will be spaced from the chuck and relatively positioned on the load line by said elements and irrespectively of the mating surfaces on the races, grinding the mating surfaces at one side of both races while they are thus held on the load line until they are coplanar, then holding the ground mating faces of both races in a true coplanar position, while the other side is exposed, and grinding the exposed side of the races while the previously ground faces are retained in coplanar position, until the mating faces of the exposed side are truly coplanar.

2. The method of machining anti-friction bearings which consists in holding by a magnetic chuck and in spaced relation thereto an assembled bearing unit composed of two separate bearing races with anti-friction elements therebetween, with one of the mating surfaces of the races out of contact with the chuck and the other in contact so the races will be relatively positioned on the load line by said elements irrespectively of the mating surfaces of the races, grinding the exposed mating surfaces while the races are thus held until they are coplanar, then holding both of the ground mating faces in coplanar relation by the chuck, and then grinding the exposed faces until they are coplanar while the previously ground faces are held in coplanar relation by the chuck.

PAUL F. HACKETHAL.